(No Model.) 3 Sheets—Sheet 1.

J. W. HYATT.
WOODEN ROLLER.

No. 434,185. Patented Aug. 12, 1890.

Attest:
L. Lee.
F. C. Fischer.

Inventor,
John W. Hyatt, per
Crane & Miller, attys.

(No Model.)  3 Sheets—Sheet 2.
J. W. HYATT.
WOODEN ROLLER.
No. 434,185.  Patented Aug. 12, 1890.
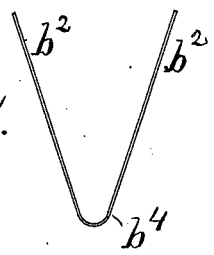
Fig. 11.
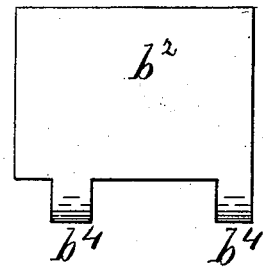
Fig. 12.
Fig. 13.
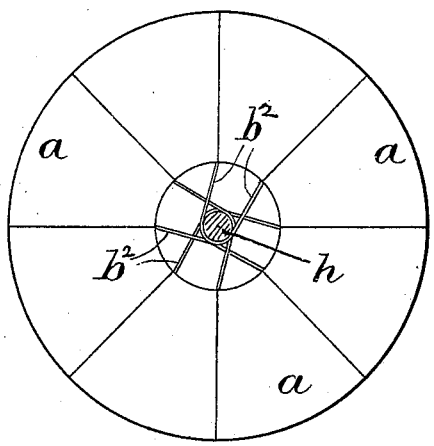
Fig. 10.
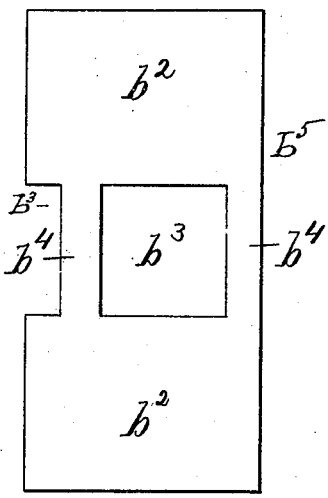
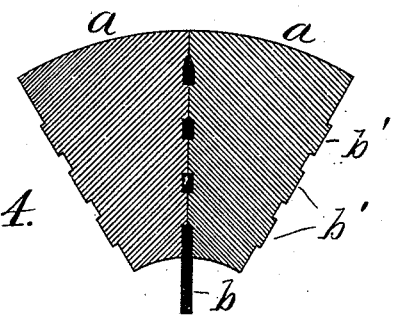
Fig. 14.
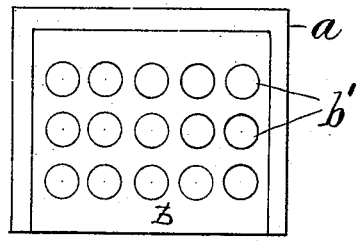
Fig. 15.
Attest:
L. Lee.
F. C. Fischer.
Inventor.
John W. Hyatt, per
Crane & Miller, attys.

(No Model.) 3 Sheets—Sheet 3.

J. W. HYATT.
WOODEN ROLLER.

No. 434,185. Patented Aug. 12, 1890.

Attest:
L. Lee.
F. C. Fischer.

Inventor.
John W. Hyatt, pr.
Crane & Miller, attys.

THE NORRIS PETERS CO., PHOTO-LITHO., WASHINGTON, D. C.

UNITED STATES PATENT OFFICE.

JOHN W. HYATT, OF NEWARK, NEW JERSEY.

WOODEN ROLLER.

SPECIFICATION forming part of Letters Patent No. 434,185, dated August 12, 1890.

Application filed June 2, 1890. Serial No. 353,999. (No model.)

*To all whom it may concern:*

Be it known that I, JOHN W. HYATT, a citizen of the United States, residing at Newark, Essex county, New Jersey, have invented certain new and useful Improvements in Wooden Rollers, fully described and represented in the following specification and the accompanying drawings, forming a part of the same.

The object of this invention is to provide for an anti-friction journal-bearing a roller having the end grain of the wood presented upon its surface; and the invention consists, first, in the combination, with truncated wooden sectors, of locking-pieces connected to the sectors and projected beyond their inner ends, and means for securing the inner ends of the locking-pieces together. This part of the invention also includes a specific form for the locking-pieces and for the means of securing them to the sectors and to one another within the central cavity.

The invention consists, secondly, in the method of securing the locking-pieces to the sectors by compressing the sectors radially upon the interposed locking-pieces, and securing the inner ends of the locking-pieces together while the sectors are under compression. The center of the roll is occupied by the means used for securing the inner ends of the locking-pieces together, for which reason the inner ends of the sectors are removed. By my method of construction the adjacent surfaces of the wooden sectors are compressed forcibly upon the metallic locking-pieces, which are formed with interstices to permit the penetration of the wood. By securing the inner ends of the locking-pieces together the wooden sectors are then prevented from expansion, and are held permanently in their compressed state with the grain of the wood substantially at right angles to the surface of the roll.

My invention will be understood by reference to the annexed drawings, in which—

Figure 1:
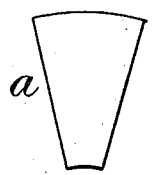
Figure 2:
Figures 3, 4:
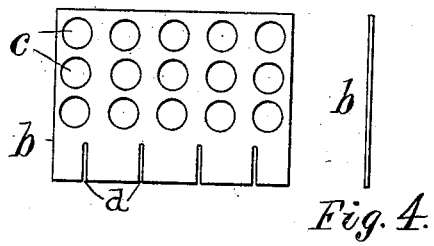
Figure 7:
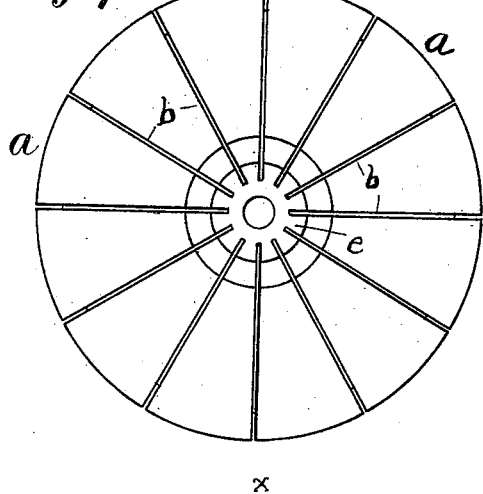
Figure 8:
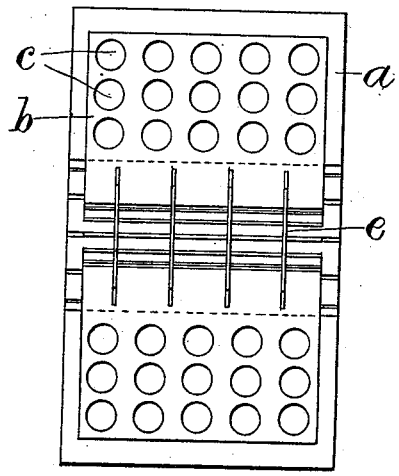
Figures 5, 6:
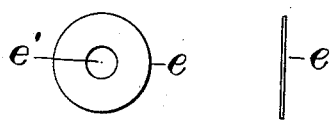
Figure 9:
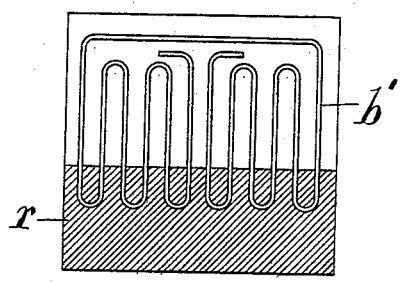
Figure 16:
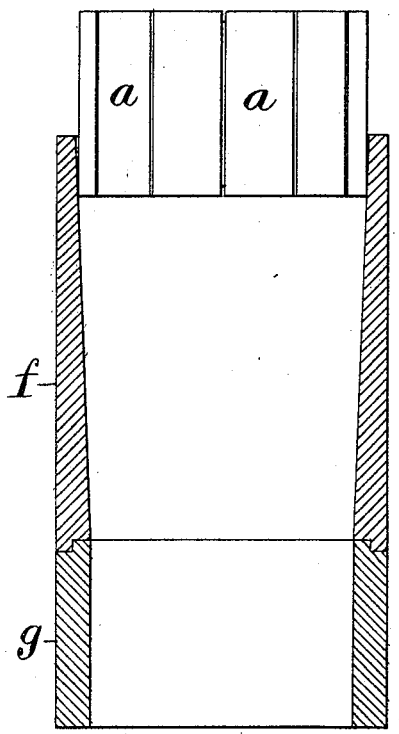
Figure 17:
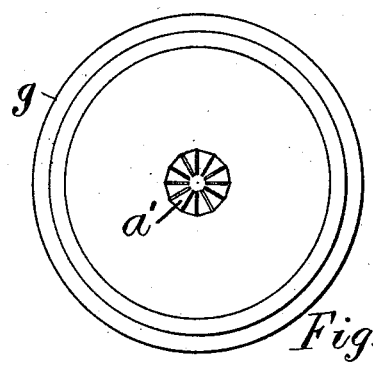
Figure 19:
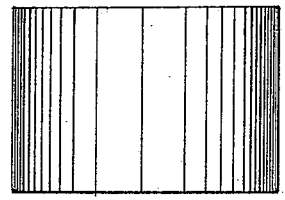
Figure 18:
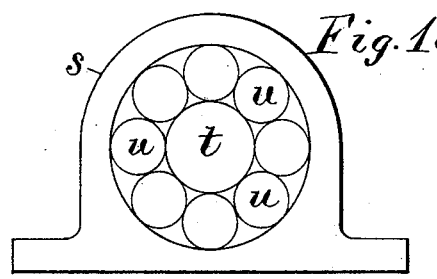

Figure 1 is an end view, and Fig. 2 a side view, of one of the wooden sectors with the grain extended radially. Fig. 3 is a side view, and Fig. 4 an end view, of a locking-piece of sheet metal. Fig. 5 is a side view, and Fig. 6 an edge view, of a tension-disk for use with the sheet-metal locking-pieces. Fig. 7 represents twelve sectors arranged with the locking-pieces and disks in readiness for compression. Fig. 8 is a section of the same on line $x\,x$ in Fig 7 at the surfaces of the locking-pieces. Fig. 9 is a side view of one section with a locking device of bent wire, and a soft-metal core cast upon such wire. Fig. 10 is a side view of a blank of alternative construction to form two locking-pieces in one piece. Fig. 11 is an end view, and Fig. 12 a side view, of the same bent in readiness for use. Fig. 13 is a side view of a roll with locking-pieces like those shown in Fig. 11, secured together at the center by a round pin. Fig. 14 is a section of two sectors compressed upon the plate $b$, and Fig. 15 is a view of the inner side of one of such compressed sectors. Fig. 16 is a diagram, in section, of a compressing-mold with the sectors in readiness for compression. Fig. 17 is a plan of the clamp-ring with the parts shown in Fig. 7 compressed therein before the inner ends of the locking-pieces are secured together. Fig. 18 is a diagram of a roller-bearing. Fig. 19 is an edge view, and Fig. 20 a side view, of the finished roll with a soft-metal core cast upon the ends of the locking-pieces.

In Fig. 7 twelve sectors $a$ are shown arranged to form a cylinder, with locking-pieces $b$ interposed between the sectors. Each of these pieces (shown in Figs. 3 and 8) is formed with perforations $c$ to permit the penetration of the wood therein when compressed. Such penetration forms studs $b'$ (shown in Fig. 14) upon the adjacent faces of the sectors, which thus grasp the holding-pieces most firmly. Slits $d$ are formed transversely in the inner edge of the plate to admit tension-disks $e$. (Shown inserted in the slits in Figs. 7 and 8.) With the sectors and locking-pieces arranged as shown in Fig. 7 it is obvious that by simultaneously pressing the sectors inward they would be laterally compressed upon the locking-pieces, and the sectors could be prevented from reaction endwise or from lateral expansion by securing the inner ends of the locking-pieces together.

As shown in Fig. 8, the locking-pieces are preferably made narrower than the length of the sectors, and the compression is in practice exerted to such a degree that the locking-pieces are wholly embedded in the wood and are not visible from the plain surface of the roll when it is finished.

In Fig. 16 a tube with tapering bore $f$ is shown with the series of sectors $a$, having the locking-pieces $b$ interposed partly in its upper end. The tube is shown provided at the bottom with a cylindrical clamp-ring $g$, and it is evident that by forcing the sectors downward through the tapering tube into the clamp-ring they would be pressed inward and held in the clamp-ring so long as desired. Their appearance when thus compressed within the clamp-ring is shown in Fig. 17, with the division-lines between the sectors wholly obliterated and the body of each locking-piece concealed in the wood, where it would be embedded within the joints of the sectors. The inner ends of the locking-pieces are shown forced into close proximity, and by previously tinning the same they are readily secured together by pouring melted solder into the cavity $a'$ between the inner ends of the sectors.

Four tension-plates $e$ are shown in Fig. 8, provided each with a hole $e'$ in the center. Such hole coincides with the inner ends of the locking-pieces in Fig. 17 and permits the free passage of the melted solder through the entire cavity. The object of these plates is to increase the strength in cross-section of the core of solder, which is obviously divided almost in two on twelve diameters, as will be perceived by inspection of the inner ends of the locking-pieces $b$ in Fig. 17. The sectors are thus firmly united together into a cylinder and when removed from the clamp-ring $g$ may be turned true and smooth, as shown in Figs. 19 and 20, and thus fitted for use in a roller-bearing.

The wooden sectors are preferably soaked in hot kerosine-oil before they are subjected to compression to expel the moisture therefrom and to protect them subsequently from the influence of moisture.

In Fig. 9 the locking-piece is shown formed of a wire $b'$, bent to form a series of loops extending partly between the sectors and partly into the cavity side of the same. The pressure upon the sectors operates to indent the wire into their adjacent faces, while the pouring of melted solder or other fusible metal within the cavity operates to engage the wires and lock them firmly to the core $r$, which is indicated in Figs. 9 and 14. The locking-pieces may be secured together without fusible metal by forming each of them with a projection at their inner end adapted to engage the other locking-pieces when forced inward. Thus Fig. 10 shows a blank $b^5$, having slots $b^3$, which form tongues $b^4$ between its opposite halves. Such blank is shown adapted when bent into the V shape shown in Figs. 11 and 12 to form two locking-pieces $b^2$, with a loop at the center. A series of such double locking-pieces is shown in Fig. 13 combined with eight sectors. The sectors are shown pressed inward, and the tongues $b^4$ are so formed upon the several pieces that they may interlock at different points in the length of the sector, like the lugs upon a door-hinge, and may thus be secured together by a single pin $h$, inserted within the loops.

Figure 20:
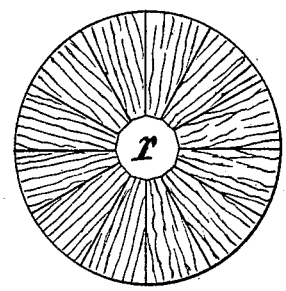

It is obvious from an inspection of Fig. 20 that the core $r$, when formed of metal or any hard material, operates to sustain the end-thrust upon the sectors when the roll is applied to sustain a shaft in a roller-bearing, as shown in Fig. 18. In this figure, $s$ represents the shell of the bearing, $t$ the shaft, and $u$ the wooden rolls, which in Fig 10 are grained to represent the arrangement of the wood fibers perpendicular to the surface of the shell and the shaft. By arranging the fibers transverse or perpendicular to the circumference of the roll it is enabled much better to sustain its form under wear than when the fibers are parallel with the surface, in which latter case the rolling pressure tends to laminate the woody structure and to thus displace or loosen the fibers. Any variation in the density of the grain also results much sooner in deforming the cylindrical shape of the roll when the fibers are parallel with the surface than when they are perpendicular or transverse thereto.

By forming the roll of a series of sectors and compressing them laterally upon one another, as described herein, I am enabled to secure a more uniform density in the entire periphery of the roll, notwithstanding the variations of density that may exist primarily in the several sectors, as the harder sectors yield less and the softer sectors more in the pressing operation, and the softer sectors are thus reduced to a density uniform with that of the harder sectors.

I have found in practice that a roll three inches in diameter and two inches long, when made by my invention, will sustain a rolling pressure of four thousand pounds transmitted from a four-inch shaft. Such sustaining power is much greater than is required in the journal-bearings of heavy car-axles, and the rolls constructed by my invention are therefore adapted for use in railroad-car bearings.

It is obvious that locking-pieces may be inserted into the substance of the sectors at their inner ends, as by screw-threads or other suitable means, instead of locking them to the sectors by compression into the substance of the same between their adjacent faces.

I have not shown herein any means of guiding or sustaining the rolls in a roller-bearing, as it does not form any part of my present invention, and I have already published a description of suitable means in my patent, No. 385,266, dated June 26, 1888.

In addition to my improved roll, I have claimed herein the method of making the same, as it is inseparable from the product.

The locking-pieces may be made of sheet or cast metal, and it is obvious that each locking-piece may be provided with lugs, like a door-hinge, instead of forming the lugs upon two adjacent pieces, as in Figs. 11 and 13.

Having thus set forth my invention, what I claim herein is—

1. A roll for a roller-bearing, consisting in the combination of a series of truncated wooden sectors, a series of locking-pieces interposed between the sectors and projected beyond their inner ends, and means within the ends of the sectors for securing the locking-pieces together.

2. A roll for a roller-bearing, consisting in the combination of a series of truncated wooden sectors, a series of locking-pieces interposed between the sectors and projected beyond their inner ends, and a core of metal cast upon the ends of the locking-pieces within the sectors to secure them together.

3. A roll for a roller-bearing, consisting in the combination of a series of truncated wooden sectors, sheet-metal locking-pieces $b$, interposed between the sectors and provided with apertures $c$ between the sectors, and their inner ends projected within the sectors and provided with the slits $d$, the tension-plates $e$, inserted in the slits, and a core of metal cast about the tension-plates and the inner ends of the locking-pieces, as and for the purpose set forth.

4. The method of making wooden rolls with the grain transverse to the surface, which consists in placing locking-pieces in position between wooden sectors, and in then compressing a series of such sectors together radially and securing the inner ends of the locking-pieces together while the sectors are under compression.

In testimony whereof I have hereunto set my hand in the presence of two subscribing witnesses.

JOHN W. HYATT.

Witnesses:
L. LEE,
THOS. S. CRANE.